US012802835B2

(12) United States Patent
Kozuma et al.

(10) Patent No.: US 12,802,835 B2
(45) Date of Patent: *Nov. 17, 2026

(54) APPARATUS FOR COLLIMATING ATOMIC BEAM, ATOMIC INTERFEROMETER, AND ATOMIC GYROSCOPE

(71) Applicants: JAPAN AVIATION ELECTRONICS INDUSTRY, LIMITED, Tokyo (JP); TOKYO INSTITUTE OF TECHNOLOGY, Tokyo (JP)

(72) Inventors: Mikio Kozuma, Kanagawa (JP); Ryotaro Inoue, Tokyo (JP); Toshiyuki Hosoya, Tokyo (JP); Atsushi Tanaka, Tokyo (JP)

(73) Assignees: JAPAN AVIATION ELECTRONICS INDUSTRY, LIMITED, Tokyo (JP); TOKYO INSTITUTE OF TECHNOLOGY, Tokyo (JP)

( * ) Notice: Subject to any disclaimer, the term of this patent is extended or adjusted under 35 U.S.C. 154(b) by 594 days.

This patent is subject to a terminal disclaimer.

(21) Appl. No.: 18/098,911

(22) Filed: Jan. 19, 2023

(65) Prior Publication Data

US 2023/0160683 A1 May 25, 2023

Related U.S. Application Data

(63) Continuation of application No. 17/285,641, filed as application No. PCT/JP2019/039770 on Oct. 9, 2019, now Pat. No. 11,614,318.

(30) Foreign Application Priority Data

Dec. 7, 2018 (JP) ................................ 2018-229762

(51) Int. Cl.

*G21K 1/02* (2006.01)
*G01C 19/58* (2006.01)

(Continued)

(52) U.S. Cl.

CPC ............... *G21K 1/02* (2013.01); *G01C 19/62* (2013.01); *G21K 1/025* (2013.01); *G21K 1/30* (2026.01);

(Continued)

(58) Field of Classification Search

CPC ....................... G01B 2290/55; G01B 9/02016; G01C 19/58; G01C 19/62; G21K 1/006; G21K 1/02; G21K 1/025

See application file for complete search history.

(56) References Cited

U.S. PATENT DOCUMENTS 6,183,817 B1 2/2001 Gersonde
6,462,333 B1 10/2002 Gersonde (Continued)

FOREIGN PATENT DOCUMENTS

JP 2004-247491 A 9/2004
WO 2007/002327 A1 1/2007

(Continued)

OTHER PUBLICATIONS

Xue, Hongbo et al. "A Continuous Cold Atomic Beam Interferometer". Journal of Applied Physics, vol. 117, Issue 9, Mar. 7, 2015. (Year: 2015).*

(Continued)

*Primary Examiner* — Michael A Lyons

(74) *Attorney, Agent, or Firm* — Greenblum & Bernstein, P.L.C.

(57) ABSTRACT

An atomic beam is irradiated with a first, a second, and a third laser beam. The first laser beam and the third laser beam each have a wavelength corresponding to a transition between a ground state and a first excited state. The second laser beam has a wavelength corresponding to a transition between the ground state and a second excited state. First, atoms each having a smaller velocity component than a (Continued)

predetermined velocity in a direction orthogonal to the traveling direction of the atomic beam are changed from the ground state to the first excited state by the first laser beam. Subsequently, a momentum is provided for individual atoms in the ground state by the second laser beam, which removes the atoms from the atomic beam. Finally, atoms in the first excited state are returned from the first excited state to the ground state by the third laser beam.

14 Claims, 5 Drawing Sheets

(51) Int. Cl.
*G01C 19/62* (2006.01)
*G21K 1/30* (2026.01)

(52) U.S. Cl.
CPC .......... *G01B 2290/55* (2013.01); *G01C 19/58* (2013.01)

(56) References Cited

U.S. PATENT DOCUMENTS

| | | | | |
|---|---|---|---|---|
| 8,143,956 | B2 | 3/2012 | Chen | |
| 10,879,918 | B1 | 12/2020 | Chen et al. | |
| 11,043,788 | B2 | 6/2021 | Chen et al. | |
| 11,614,318 | B2 * | 3/2023 | Kozuma | G21K 1/02 356/450 |
| 11,808,577 | B2 * | 11/2023 | Inoue | G01C 19/58 |
| 2004/0206896 | A1 | 10/2004 | Ohmukai et al. | |
| 2009/0180357 | A1 | 7/2009 | Chen | |
| 2017/0016710 | A1 | 1/2017 | Black et al. | |
| 2020/0256677 | A1 | 8/2020 | Kozuma et al. | |
| 2020/0300630 | A1 | 9/2020 | Kozuma et al. | |
| 2020/0318968 | A1 | 10/2020 | Kozuma et al. | |
| 2020/0333139 | A1 | 10/2020 | Kozuma et al. | |
| 2021/0028595 | A1 | 1/2021 | Chen et al. | |
| 2021/0233676 | A1 | 7/2021 | Inoue et al. | |
| 2021/0345475 | A1 | 11/2021 | Cashen et al. | |
| 2022/0319730 | A1 | 10/2022 | Johansen et al. | |
| 2023/0011067 | A1 * | 1/2023 | Inoue | G02F 2/02 |
| 2023/0332893 | A1 * | 10/2023 | Taniguchi | G01C 19/58 |
| 2023/0332895 | A1 * | 10/2023 | Inoue | G01C 21/165 |
| 2025/0027770 | A1 * | 1/2025 | Kozuma | G01C 19/66 |
| 2025/0044099 | A1 * | 2/2025 | Kozuma | G01C 21/16 |

FOREIGN PATENT DOCUMENTS

| | | |
|---|---|---|
| WO | 2019/073655 A | 4/2019 |
| WO | 2019/073656 A | 4/2019 |
| WO | 2019/073657 A | 4/2019 |

OTHER PUBLICATIONS

Bernet et al., "Matter waves in time-modulated complex light potentials", Physical Review, Jul. 17, 2000, pp. 023606-1-20.
Schoser et al., "Intense source of cold Rb atoms from a pure two-dimensional magneto-optical trap", Physical Review, Aug. 26, 2002, pp. 023410-1-10.
Cvejanovic et al., "Design and characterization of an atomic beam oven for combined laser and electron impact experiments", Institute of Physics Publisheing, Aug. 14, 2002, pp. 1482-1487.
Gustavson et al., "Precision Rotation Measurements with an Atom Interferometer Gyroscope", Physical Review Letters, Mar. 17, 1997, pp. 2046-2049.
Aoki et al., "High-finesse atomic multiple-beam interferometer comprised of copropagating stimulated Raman-pulse fields", Physical Review, May 16, 2001, pp. 063611-1-8.
Balykin et al., "Collimation and decollimation of atomic beams by laser radiation", Applied Physics B, Jan. 1987, pp. 51-54.
U.S. Appl. No. 16/972,248 to Ryotaro Inoue et al., filed Dec. 4, 2020.
International Search Report in International Patent Application No. PCT/JP2019/039770, dated Jan. 7, 2020.
Schieder et al., "Atomic Beam Deflection by the Light of a Tunable Dye Laser," Optics Communications vol. 5, No. 5, Aug. 1, 1972, pp. 337-340.
Extended European Search Report of Application No. 19891725.4 from Nov. 10, 2021.
John J. McFerran and Andre N. Luiten, "Fractional frequency instability in the 10-14 range with a thermal beam optical frequency reference," J. Opt. Soc. Am. B 27, 277-285 (Year: 2010).

* cited by examiner

APPARATUS FOR COLLIMATING ATOMIC BEAM, ATOMIC INTERFEROMETER, AND ATOMIC GYROSCOPE

CROSS REFERENCE TO RELATED APPLICATIONS

This is a continuation of U.S. patent application Ser. No. 17/285,641, filed Apr. 15, 2021, which is a National Phase application of International Application No. PCT/JP2019/039770, filed Oct. 9, 2019, which claims the benefit of priorities to Japanese Patent Application No. 2018-229762, filed on Dec. 7, 2018. The disclosure of each of the above-mentioned documents, including the specification, drawings, and claims, is incorporated herein by reference in its entirety.

TECHNICAL FIELD

The present invention relates to an atomic-beam collimation technique.

BACKGROUND ART

In recent years, a collimated atomic beam has been used in, for example, atomic-beam lithography and atomic interferometers. Known techniques for collimating an atomic beam include a technique of collimating an atomic beam, which comes from an atomic beam source, by making the atomic beam pass through two or more slits spaced in the traveling direction of the atomic beam or a technique of collimating an atomic beam by making the atomic beam pass through a two-dimensional magneto-optical trap (2D-MOT) mechanism. Regarding the former technique, for example, see the configuration of FIG. 2 in Non-patent literature 1 as listed below. Regarding the latter technique, for example, see Non-patent literature 2 as listed below.

LIST OF PRIOR ART LITERATURE

Non-patent literature 1: St. Bernet, R. Abfalterer, C. Keller, M. Oberthaler, J. Schmiedmayer and A. Zeilinger, "Matter waves in time-modulated complex light potentials," Phys. Rev. A 62, 023606 (2000).

Non-patent literature 2: J. Schoser, A. Batar, R. Low, V. Schweikhard, A. Grabowski, Yu. B. Ovchinnikov, and T. Pfau, "Intense source of cold Rb atoms from a pure two-dimensional magneto-optical trap," PHYSICAL REVIEW A, 66, 023410 2002.

The atomic-beam collimation technique with slits achieves proper collimation according to the layout of the slits. However, the atomic-beam collimation technique with slits considerably limits the travel of an atomic beam through the slits, thereby reducing an atomic flux. Moreover, in the atomic-beam collimation technique with slits, the slits have a large spacing in the traveling direction of the atomic beam, so that the technique is not suitable for downsizing.

The atomic-beam collimation technique with a 2D-MOT mechanism does not limit the travel of an atomic beam and thus obtains a proper atomic flux. Furthermore, the atomic-beam collimation technique with a 2D-MOT mechanism can be implemented in a smaller size particularly in the traveling direction of an atomic beam as compared with the atomic-beam collimation technique with slits. In the atomic-beam collimation technique with a 2D-MOT mechanism, however, a cooling temperature is limited due to the natural width of a cooling transition, leading to difficulty in obtaining proper collimation.

BRIEF SUMMARY OF THE INVENTION

An object of the present invention is to provide an atomic-beam collimation technique that can be implemented in a smaller size particularly in the traveling direction of an atomic beam as compared with an atomic-beam collimation technique with slits, can reduce a decrease in atomic flux, and can obtain proper collimation.

A method of collimating an atomic beam according to the present disclosure includes a first step of irradiating the atomic beam with a first laser beam, the first laser beam having a wavelength corresponding to a transition between a ground state and a first excited state of an atom in the atomic beam, thereby selectively changing, from the ground state to the first excited state, atoms in the atomic beam each having a velocity component in a direction orthogonal to the traveling direction of the atomic beam, the velocity component being smaller than a predetermined velocity; a second step of irradiating, after the first step, the atomic beam with a second laser beam, the second laser beam having a wavelength corresponding to a transition between the ground state and a second excited state of the atom in the atomic beam, thereby providing recoil momenta to atoms in the ground state in the atomic beam to change a traveling direction of the atoms in the ground state in the atomic beam; and a third step of irradiating, after the second step, the atomic beam with a third laser beam, the third laser beam having the wavelength corresponding to the transition between the ground state and the first excited state, thereby changing the atoms in the first excited state in the atomic beam from the first excited state to the ground state.

An apparatus for collimating an atomic beam of the present invention includes an irradiator for irradiating an atomic beam with a first laser beam, a second laser beam, and a third laser beam. The atomic beam is irradiated with, in this order, the first laser beam, the second laser beam, and the third laser beam. The first laser beam is a laser beam having a wavelength corresponding to a transition between the ground state and the first excited state. The second laser beam is a laser beam having a wavelength corresponding to a transition between the ground state and the second excited state. The third laser beam is a laser beam having a wavelength corresponding to a transition between the ground state and the first excited state.

Effects of the Invention

The present invention can be implemented in a smaller size particularly in the traveling direction of an atomic beam as compared with an atomic-beam collimation technique with slits, can reduce a decrease in atomic flux, and can obtain proper collimation.

DETAILED DESCRIPTION

Figure 1:
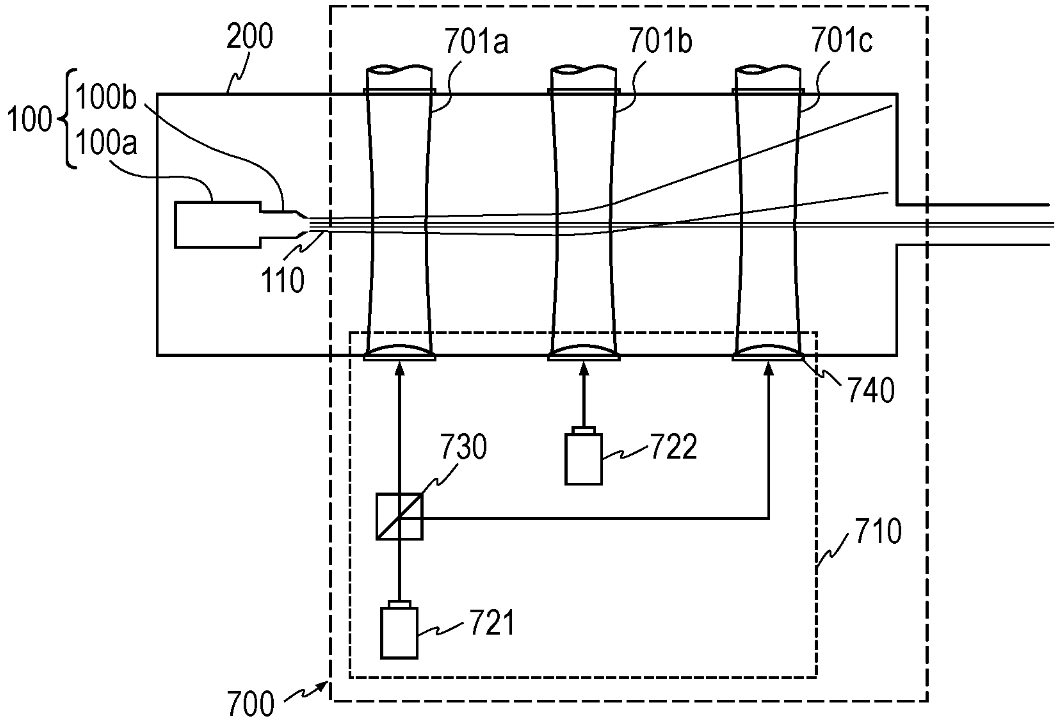
FIG. 1 is an explanatory drawing of atomic beam collimation.

An embodiment of the present invention will be described below with reference to the accompanying drawings. The drawings are prepared for the understanding of the embodiment, and the dimensions of illustrated constituent elements are different from the actual dimensions.

In the illustrated embodiment, an apparatus 700 for collimating an atomic beam collimates a thermal atomic beam 110 that comes from an atomic beam source 100 stored in a vacuum chamber 200.

The atomic beam source 100 continuously generates a thermal atomic beam. The velocity of the thermal atomic beam is, for example, about 100 m/s. An example of the atomic beam source 100 will be described below. The atomic beam source 100 includes, for example, a body part 100*a* and a nozzle 100*b* communicating with the body part 100*a*. In the body part 100*a*, gaseous atoms are obtained by heating a solid composed of a single element of high purity. Gaseous atoms obtained by the body part 100*a* are ejected as the thermal atomic beam 110 from the heated nozzle 100*b* to the outside of the atomic beam source 100. See FIG. 1 of Reference literature 1 illustrating an example of the configuration of the atomic beam source 100.

(Reference literature 1): Cvejanovic D and Murray A J, "Design and characterization of an atomic beam oven for combined laser and electron impact experiments," Meas. Sci. Tech. 13 1482-1487 (2002).

The traveling direction of the thermal atomic beam 110 is the direction of a line extended by connecting the peaks of the density distributions of atoms included in the thermal atomic beam 110. The traveling direction usually accords with the ejection direction of the nozzle 100*b*, that is, the extension direction of the central axis of the nozzle 100*b*. A flow of gaseous atoms condensed through a discharge hole at the tip of the nozzle 100*b* is not a parallel flow but a Knudsen flow, that is, an outflow spouting at a small solid angle. Thus, the thermal atomic beam 110 includes atoms each having a velocity component in a direction orthogonal to the traveling direction of the thermal atomic beam. Hereinafter, "a direction orthogonal to the traveling direction of the thermal atomic beam" will be simply referred to as "orthogonal direction."

Removing atoms other than atoms each having a sufficiently small velocity component in the orthogonal direction from the thermal atomic beam 110 achieves proper collimation for the thermal atomic beam 110. The outline of the embodiment based on this concept will be described below. First, atoms each having a sufficiently small velocity component in the orthogonal direction are changed from a ground state to a first excited state. This is, so to speak, the evacuation of atoms to a safety zone. Subsequently, before the atoms in the first excited state fall into the ground state due to spontaneous emission, a momentum is provided for individual atoms in the ground state, that is, for individual atoms other than atoms each having a sufficiently small velocity component in the orthogonal direction. The moving direction of the individual atoms is changed after the momentum is provided, and the atoms provided with the momenta are mostly removed from the thermal atomic beam 110. Finally, atoms each having a sufficiently small velocity component in the orthogonal direction are returned from the first excited state to the ground state by stimulated emission. This is, so to speak, a cancellation of the evacuation of atoms. Hence, only atoms each having a sufficiently small velocity component in the orthogonal direction are left in the thermal atomic beam 110. In this embodiment, three laser beams along the traveling direction of an atomic beam are used. The laser beams are preferably Gaussian beams. The three laser beams along the traveling direction of an atomic beam can have an overall length shorter than a spacing of slits in the traveling direction of an atomic beam in the atomic-beam collimation technique with slits. Furthermore, the travel of atoms each having sufficiently small velocity component in the orthogonal direction is not limited, thereby reducing a decrease in atomic flux as compared with the atomic-beam collimation technique with slits. The detail of the embodiment will be discussed below.

The thermal atomic beam 110 enters the apparatus 700 for collimating an atomic beam (see FIG. 1). The apparatus 700 for collimating an atomic beam includes an irradiator 710 for irradiating the thermal atomic beam 110 with a first laser beam 701*a*, a second laser beam 701*b*, and a third laser beam 701*c* in the orthogonal direction. The thermal atomic beam 110 is irradiated, along the traveling direction of the thermal atomic beam, with the first laser beam 701*a*, the second laser beam 701*b*, and the third laser beam 701*c* in this order and independently of each other.

The first laser beam 701*a* has a wavelength $\lambda_1$ corresponding to a transition between the ground state and the first excited state of individual atoms in the thermal atomic beam 110. In the course of the thermal atomic beam 110 passing through the first laser beam 701*a*, individual atoms in the thermal atomic beam 110 that have velocity components smaller than predetermined Av in the orthogonal direction are changed from the ground state to the first excited state (first step S1). Av will be additionally described below. Typically, an absorption spectral line of an atom has a natural width derived from the life of an excited state. Additionally, as broadening of an absorption spectral line of atoms in the thermal atomic beam 110 irradiated with the first laser beam 701*a*, for example, power broadening occurs depending upon the laser intensity of the first laser beam 701*a*. Power broadening may be called saturation broadening. When the absorption spectral line has a full width at half maximum (FWHM) of Γ, (Eq. 1a) is established as expressed below. In particular, when power broadening makes a large contribution, as has been well known, (Eq. 1b) may be established as expressed below. In this case, $\Gamma_1$ is the natural width of a transition between the ground state and the first excited state, $k_1$ is the wave number of the first laser beam 701*a*, $I_0$ is the power density of the first laser beam 701*a*, and $I_0$ is the saturation intensity of the transition. A life $\tau_1(=1/\Gamma_1)$ of the first excited state is to satisfy the after-mentioned conditions.

[Formula 1]

$$\Delta v=\Gamma/k_1 \tag{Eq. 1a}$$

$$\Delta v\cong\Gamma_1(\sqrt{1+I_1/I_0})/k_1 \tag{Eq.1b}$$

The second laser beam 701*b* has a wavelength $\lambda_2$ corresponding to a transition between the ground state and the second excited state of individual atoms in the thermal atomic beam 110. After the processing of the first step, in the course of the thermal atomic beam 110 passing through the second laser beam 701*b*, individual atoms in the ground state in the thermal atomic beam 110, that is, individual atoms that have not been changed to the first excited state in the processing of the first step acquire recoil momenta by repeatedly absorbing and emitting photon energy. In the resonance absorption of photon energy, an atom receives momenta in the traveling direction of the second laser beam 701*b*. Since spontaneous emission is isotropic emission, the average of momentum variations is 0 during multiple emissions. Thus, by repeating the cycle of absorption and emission multiple times, an atom receives momenta in the traveling direction of the second laser beam 701*b*. This changes the moving direction of atoms that have not been changed to the first excited state in the first step (second step S2).

Conditions to be preferably satisfied in the first excited state and the second excited state will be described below.

Figure 2:
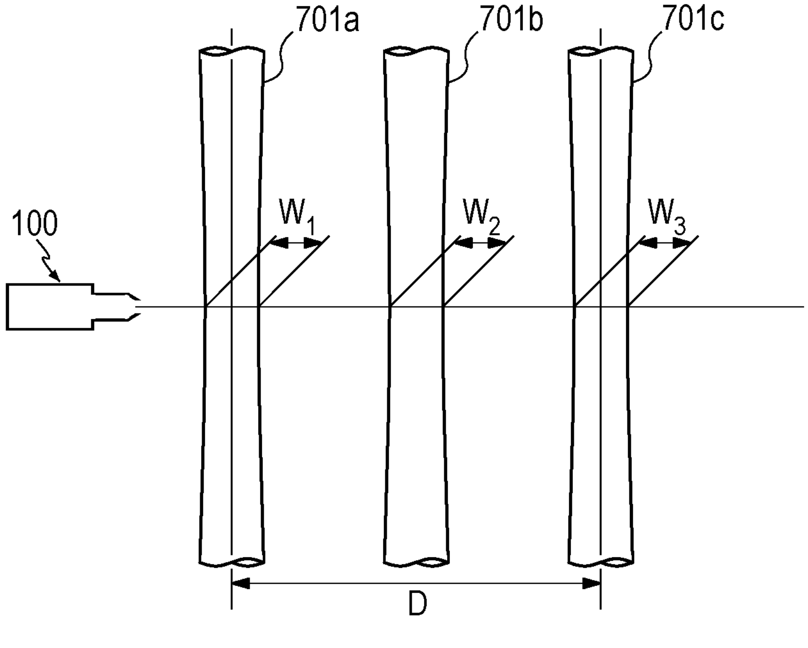
FIG. 2 is an explanatory drawing of the dimensions of constituent elements in an apparatus for collimating an atomic beam.

If an atom in the first excited state falls into the ground state due to spontaneous emission before the completion of processing in a third step, this instance raises problems: for example, the atom may acquire a random recoil momentum by spontaneous emission and acquire a recoil momentum by the second laser beam 701*b*, or the atom may be changed to the first excited state again by the third laser beam 701*c*. Thus, the life $\tau_1$ of the first excited state is preferably longer than a duration of time from the start of processing in the first step, that is, the arrival of an atom A in the thermal atomic beam 110 at the first laser beam 701*a* to the completion of the third step, that is, the escape of the atom A from the third laser beam 701*c*. From another point of view, as illustrated in FIG. 2, the life $\tau_1$ of the first excited state preferably satisfies (Eq.2a) as expressed below, where D is an inter-axial distance between the central axis of the first laser beam 701*a* and the central axis of the third laser beam 701*c*, $W_1$ is the beam width of the first laser beam 701*a* on the extension of the central axis of the thermal atomic beam 110, that is, the central axis of the nozzle 100*b*, $W_3$ is the beam width of the third laser beam 701*c* on the central axis of the thermal atomic beam 110, and V is the mean velocity of atoms in the traveling direction of the thermal atomic beam 110. As a matter of course, (Eq.2b) is desirably established in an actual design. The beam width of the laser beam is, for example, $1/e^2$ width at a beam waist.

[Formula 2]

$$\tau_1 \geq \frac{D + W_1/2 + W_3/2}{V} \qquad \text{(Eq. 2a)}$$

$$\tau_1 > \frac{D + W_1/2 + W_3/2}{V} \qquad \text{(Eq. 2b)}$$

If an atom that has not been changed to the first excited state in the processing of the first step acquires a small recoil momentum in the processing of the second step, a small change is made to the traveling direction of the atom. In particular, an atom having a negative velocity component in the traveling direction of the second laser beam 701*b* is preferably provided with a recoil momentum until the atom has a positive velocity component greater than or equal to zero. Therefore, the following conditions are desirably satisfied. The atom absorbs photon energy preferably at least $v_0/v_{recoil,\lambda 2}$ times while the thermal atomic beam 110 is irradiated with the second laser beam 701*b*, where $v_0$ is the estimated maximum value of the speed components in the orthogonal direction of individual atoms in the thermal atomic beam 110, $v_{recoil,\lambda 2}$ is a recoil velocity in the orthogonal direction received by an atom in the thermal atomic beam 110 from a photon in the second laser beam 701*b*, and $W_2$ is the beam width of the second laser beam 701*b* on the central axis of the thermal atomic beam 110. In other words, the life $\tau_2$ of the second excited state preferably satisfies (Eq.3a) as expressed below. As a matter of course, (Eq.3b) is desirably established in an actual design. Additionally, $v_{recoil,\lambda 2}$ is calculated by (Eq.4) as expressed below.

[Formula 3]

$$\frac{W_2}{V} \geq \tau_2 \times \frac{v_0}{v_{recoil,\lambda_2}} \qquad \text{(Eq. 3a)}$$

$$\frac{W_2}{V} > \tau_2 \times \frac{v_0}{v_{recoil,\lambda_2}} \qquad \text{(Eq. 3b)}$$

$$v_{recoil,\lambda_2} = \frac{h}{m \cdot \lambda_2} \qquad \text{(Eq. 4)}$$

The third laser beam 701*c* has a wavelength $\lambda_1$ corresponding to a transition between the ground state and the first excited state. After the processing of the second step, in the course of the thermal atomic beam 110 passing through the third laser beam 701*c*, individual atoms in the thermal atomic beam 110 in the first excited state are changed from the first excited state to the ground state by stimulated emission (third step S3). Hence, a collimated thermal atomic beam 110*a* including atoms with velocity components in the orthogonal direction smaller than $\Delta v$ is obtained. An atom with a velocity component in the orthogonal direction smaller than $\Delta v$ acquires one recoil momentum in the traveling direction of the first laser beam 701*a* in the processing of the first step, but the atom loses one recoil momentum in the opposite direction by stimulated emission in the processing of the third step. Thus, the velocity component of the atom in the orthogonal direction is not changed.

In the following specific example, atoms in the thermal atomic beam 110 of the embodiment are calcium.

Figure 3:
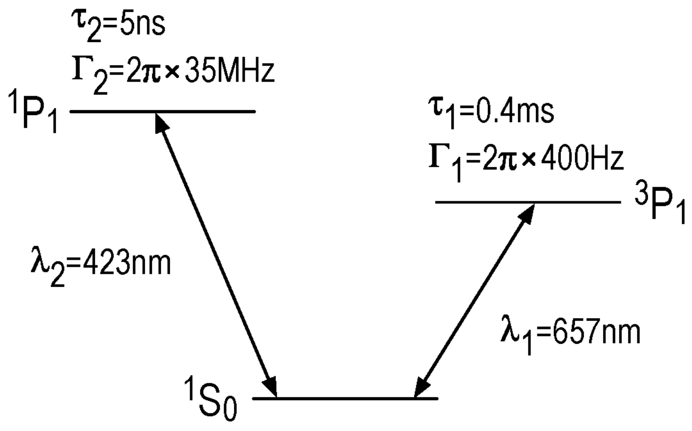
FIG. 3 is an explanatory drawing of the relationship among a ground state, a first excited state, and a second excited state.

The first laser beam 701*a* and the third laser beam 701*c* have a wavelength $\lambda_1$=657 nm corresponding to a transition between an energy level ($^1S_0$) in the ground state and an energy level ($^3P_1$) in the first excited state (see FIG. 3). The natural width $\Gamma_1$ of a transition between the ground state and the first excited state is 2π×400 Hz, and the life $\tau_1$ of the first excited state is 0.4 ms. In this case, $\Gamma_1/k_1=2.6\times10^{-4}$ m/s.

The second laser beam 701*b* has a wavelength $\lambda_2$=423 nm corresponding to a transition between the energy level ($^1S_0$) in the ground state and an energy level ($^1P_1$) in the second excited state (see FIG. 3). The natural width $\Gamma_2$ of a transition between the ground state and the second excited state is 2π×35 MHz, and the life $\Gamma_2$ of the second excited state is 5 ns. In the thermal atomic beam 110, $v_0$ is at most 50 m/s. In this example, $v_{recoil,\lambda 2}=2.4\times10^{-2}$ m/s is determined from (Eq.4). In this case, when the second laser beam 701*b* has a beam width on the order of $10^{-2}$ m, an atom absorbs photon energy about $10^3$ times while the thermal atomic beam 110 is irradiated with the second laser beam 701*b*, thereby providing sufficient recoil momenta for the atom that has not been changed to the first excited state in the first step.

Thus, the specific example proves that proper collimation can be achieved.

In the foregoing embodiment, each of the three laser beams satisfying the foregoing conditions, that is, each of the first laser beam 701*a*, the second laser beam 701*b*, and the third laser beam 701*c* is obtained by properly setting a beam waist, a wavelength, and light intensity. A beam waist can be optically set by, for example, condensing a laser beam through a lens, and light intensity can be electrically set by, for example, adjusting an output. The configurations of the generators of the laser beams are not different from conventional configurations and thus an explanation is omitted regarding the configuration of the irradiator 710 in which the generators of the three laser beams are placed. FIG. 1 schematically illustrates laser light sources 721 and 722 and a lens 740. The first laser beam 701*a* and the third laser beam 701*c* may share the same laser light source. In this case, the first laser beam 701*a* and the third laser beam 701*c* are obtained by splitting a laser beam, which is emitted from the laser light source 721, through a beam splitter 730.

A Mach-Zehnder atomic interferometer 500 including the apparatus 700 for collimating an atomic beam will be described below. The Mach-Zehnder atomic interferometer 500 includes the atomic beam source 100, the apparatus 700 for collimating an atomic beam, an interference device 250, a moving standing light wave generator 350, and a monitor 400 (see FIG. 4). In this example, the atomic beam source 100, the interference device 250, and the monitor 400 are stored in a vacuum chamber, which is not illustrated.

As described above, the thermal atomic beam 110*a* collimated by the apparatus 700 for collimating an atomic beam enters the interference device 250.

Before the explanation of the interference device 250, the moving standing light wave generator 350 will be described below. In the Mach-Zehnder atomic interferometer 500, n-th order Bragg diffraction is used. In this case, n is a predetermined positive integer greater than or equal to 2. The moving standing light wave generator 350 generates three moving standing light waves satisfying n-th order Bragg condition, that is, a first moving standing light wave 201*a*, a second moving standing light wave 201*b*, and a third moving standing light wave 201*c* are generated. The moving standing light waves also satisfy the following conditions: the first moving standing light wave 201*a* has the function of a splitter for an atomic beam, the second moving standing light wave 201*b* has the function of a mirror for an atomic beam, and the third moving standing light wave 201*c* has the function of a combiner for an atomic beam.

Figure 4:
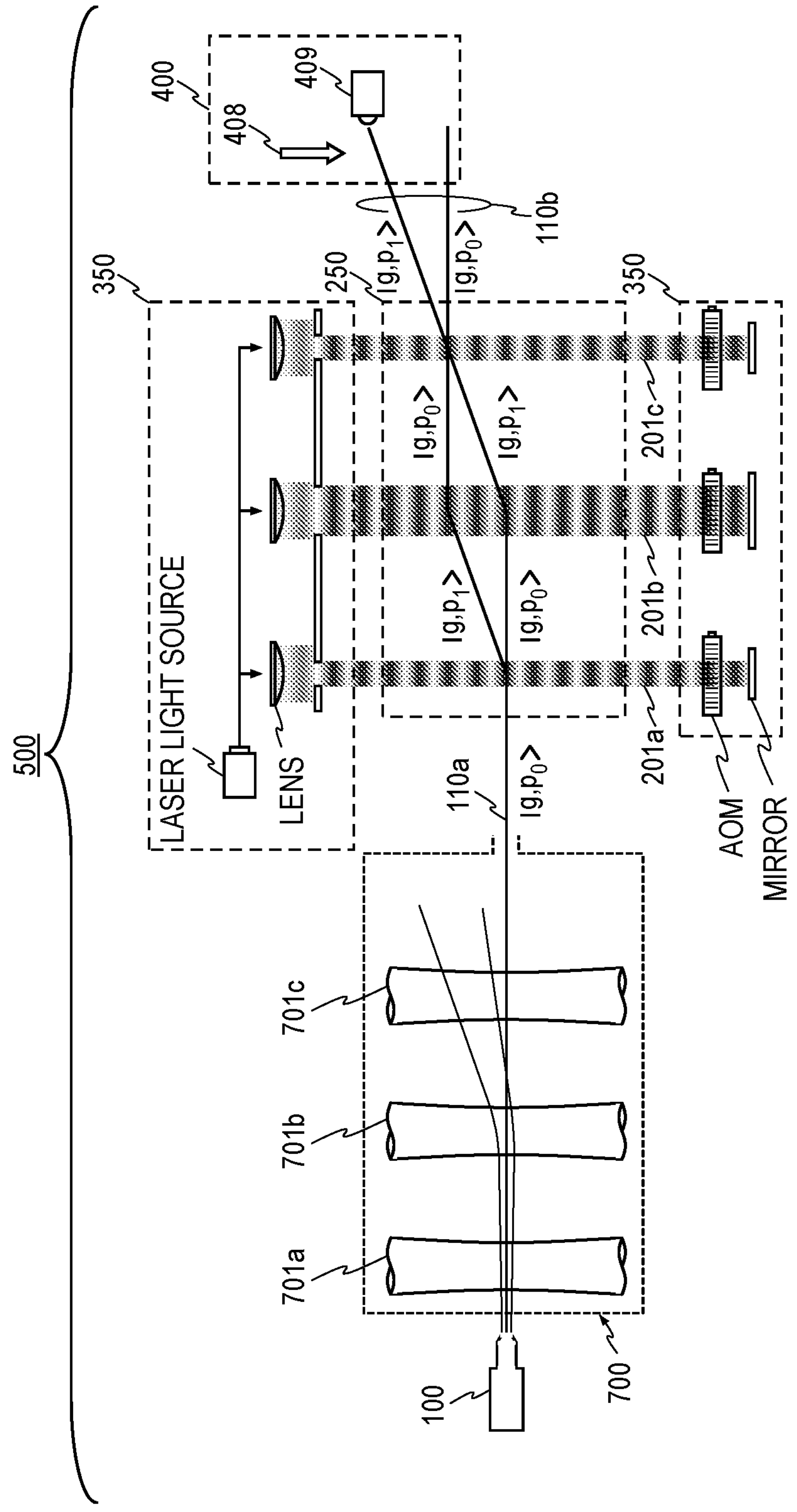
FIG. 4 is an explanatory drawing of a Mach-Zehnder atomic interferometer including an apparatus for collimating an atomic beam.
Figure 5:
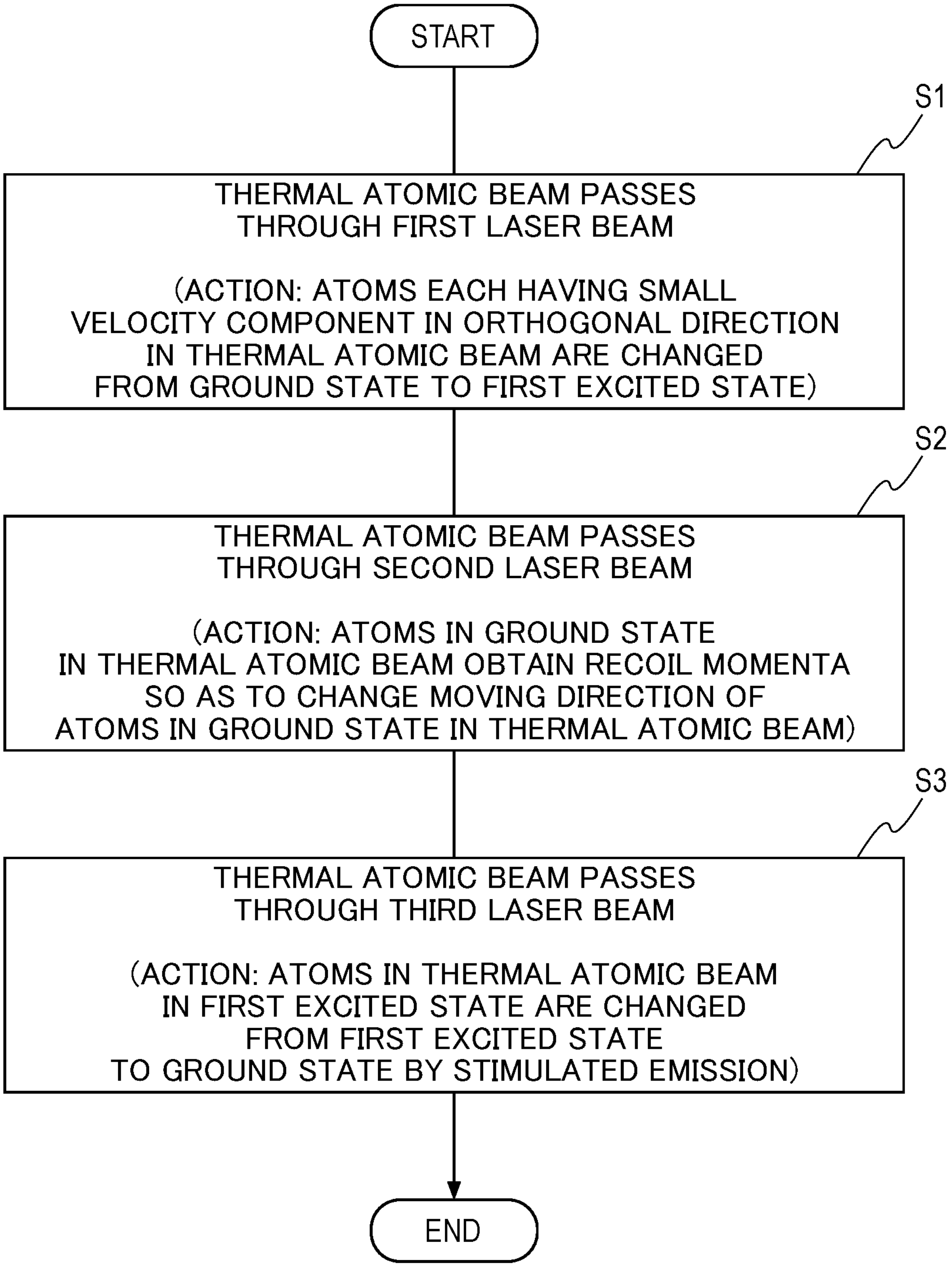
FIG. 5 is a processing flow of the atomic beam collimation.

Each of the three moving standing light waves 201*a*, 201*b*, and 201*c* satisfying the condition is obtained by properly setting the beam waist, the wavelength, and the light intensity of a Gaussian beam and a difference frequency between counterpropagating laser beams. The beam waist of a Gaussian beam can be optically set by, for example, condensing a laser beam through a lens, and the light intensity of the Gaussian beam can be electrically set by, for example, adjusting the output of the Gaussian beam. In other words, the generation parameter of the moving standing light wave is different from a conventional generation parameter. The configuration of the moving standing light wave generator 350 for generating the three moving standing light waves is not different from a conventional configuration, and thus the explanation of the configuration of the moving standing light wave generator 350 is omitted. FIG. 4 schematically illustrates, for example, the laser light source, the lenses, mirrors, and AOMs.

In the interference device 250, the thermal atomic beam 110*a* passes through the three moving standing light waves 201*a*, 201*b*, and 201*c*. In the atomic interferometer of the present example, a transition by photoirradiation between two different momentum states $|g, p_0\rangle$ and $|g, p_1\rangle$ in the same internal state is used.

In the course of the thermal atomic beam 110*a* passing through the first moving standing light wave 201*a*, the state of individual atoms in an initial state of $|g, p_0\rangle$ is changed to a superposition state of $|g, p_0\rangle$ and $|g, p_1\rangle$. By setting appropriately interaction between the first moving standing light wave 201*a* and atoms, to be specific, by setting appropriately a beam waist, a wavelength, light intensity, and a difference frequency between counterpropagating laser beams, the ratio of the existence probability of $|g, p_0\rangle$ and the existence probability of $|g, p_1\rangle$ immediately after the passage through the first moving standing light wave 201*a* becomes 1:1. While transiting from $|g, p_0\rangle$ to $|g, p_1\rangle$ through the absorption and emission of 2n photons traveling against each other, each atom acquires momentum ($=p_1-p_0$) of the 2n photons. Thus, the moving direction of atoms in the state of $|g, p_1\rangle$ is considerably deviated from the moving direction of atoms in the state of $|g, p_0\rangle$. Specifically, in the course of the thermal atomic beam 110*a* passing through the first moving standing light wave 201*a*, the thermal atomic beam 110*a* splits into an atomic beam composed of atoms in the state of $|g, p_0\rangle$ and an atomic beam composed of atoms in the state of $|g, p_1\rangle$ at a ratio of 1:1. The traveling direction of an atomic beam composed of atoms in the state of $|g, p_1\rangle$ is a direction based on the n-th order Bragg condition. An angle formed by a direction of 0-order light, that is, a traveling direction of an atomic beam composed of atoms in the state of $|g, p_0\rangle$, which has not been subjected to Bragg diffraction, and the direction based on the n-th order Bragg condition is n times larger than an angle formed by the direction of 0-order light and a direction based on a first-order Bragg condition. In short, spread, in other words, separation between the traveling direction of an atomic beam composed of atoms in the state of $|g, p_0\rangle$ and the traveling direction of an atomic beam composed of atoms in the state of $|g, p_1\rangle$ can be made larger.

After the split, the atomic beam composed of atoms in the state of $|g, p_0\rangle$ and the atomic beam composed of atoms in the state of $|g, p_1\rangle$ pass through the second moving standing light wave 201*b*. By setting appropriately interaction between the second moving standing light wave 201*b* and atoms, in other words, by setting appropriately a beam waist, a wavelength, light intensity, and a difference frequency between counterpropagating laser beams, the atomic beam composed of atoms in the state of $|g, p_0\rangle$ is reversed to an atomic beam composed of atoms in the state of $|g, p_1\rangle$ in the transit process of passing through the second moving standing light wave 201*b*, and the atomic beam composed of atoms in the state of $|g, p_1\rangle$ is reversed to an atomic beam composed of atoms in the state of $|g, p_0\rangle$ in the transit process of passing through the second moving standing light wave 201*b*. At this time, in the former, the moving direction of atoms that have transitioned from $|g, p_0\rangle$ to $|g, p_1\rangle$ is deviated from the moving direction of atoms in the state of $|g, p_1\rangle$ as described above. Hence, the traveling direction of the atomic beam composed of atoms in the state of $|g, p_1\rangle$ after the passage through the second moving standing light wave 201*b* becomes parallel to the traveling direction of the atomic beam composed of atoms in the state of $|g, p_1\rangle$ after the passage through the first moving standing light wave 201*a*. In the latter, in transition from $|g, p_1\rangle$ to $|g, p_0\rangle$ through the absorption and emission of 2n photons traveling against each other, each atom loses the same momentum as the momentum obtained from the 2n photons. In other words, the moving direction of atoms after transition from $|g, p_1\rangle$ to $|g, p_0\rangle$ is deviated from the moving direction of atoms in the state of $|g, p_1\rangle$ before the transition. Hence, the traveling direction of the atomic beam composed of atoms in the state of $|g, p_0\rangle$ after the passage through the second moving standing light wave 201*b* becomes parallel to the traveling direction of the atomic beam composed of atoms in the state of |g, $p_0$> after the passage through the first moving standing light wave 201*a*.

After the reversal, the atomic beam composed of atoms in the state of |g, $p_0$> and the atomic beam composed of atoms in the state of |g, $p_1$> pass through the third moving standing light wave 201*c*. At this transit period, the atomic beam composed of atoms in the state of |g, $p_0$> after the reversal and the atomic beam composed of atoms in the state of |g, $p_1$> after the reversal cross each other. By setting appropriately interaction between the third moving standing light wave 201*c* and atoms, in other words, by setting appropriately a beam waist, a wavelength, light intensity, and a difference frequency between counterpropagating laser beams, it is possible to obtain a thermal atomic beam 110*b* corresponding to a superposition state of |g, $p_0$> and |g, $p_1$> of individual atoms included in the crossing region of the atomic beam composed of atoms in the state of |g, $p_0$> and the atomic beam composed of atoms in the state of |g, $p_1$>. The traveling direction of the thermal atomic beam 110*b* obtained after the passage through the third moving standing light wave 201*c* is theoretically any one or both of the direction of 0-order light and the direction based on the n-th order Bragg condition.

While an angular velocity or an acceleration within a plane including two paths of atomic beams from the action of the first moving standing light wave 201*a* to the action of the third moving standing light wave 201*c* is applied to the Mach-Zehnder atomic interferometer 500, a phase difference is produced in the two paths of the atomic beams from the action of the first moving standing light wave 201*a* to the action of the third moving standing light wave 201*c*. The phase difference is reflected on the existence probability of the state of |g, $p_0$> and the existence probability of the state of |g, $p_1$> of individual atoms after passing through the third moving standing light wave 201*c*. Thus, the monitor 400 can detect an angular velocity or an acceleration by monitoring the thermal atomic beam 110*b* from the interference device 250, that is, the thermal atomic beam 110*b* obtained after passing through the third moving standing light wave 201*c*. For example, the monitor 400 irradiates the thermal atomic beam 110*b* from the interference device 250 with a probe light 408 and detects fluorescence from atoms in the state of |g, $p_1$> using a photodetector 409. Examples of the photodetector 409 include a photomultiplier tube and a fluorescence photodetector. According to the present example, because a spatial resolution improves, in other words, because a large spacing is provided between the two paths after the passage through the third moving standing light wave, specifically, the atomic beam composed of atoms in the state of |g, $p_0$> and the atomic beam composed of atoms in the state of |g, $p_1$>, a CCD image sensor can also be used as the photodetector 409. Alternatively, when a channeltron is used as the photodetector 409, one atomic beam of the two paths after the passage through the third moving standing light wave may be ionized by a laser or the like instead of a probe light, and ions may be detected using the channeltron.

Atoms used in the Mach-Zehnder atomic interferometer 500 satisfy the atom selection conditions described along with the description of the apparatus 700 for collimating an atomic beam and are preferably alkaline earth metal atoms, alkaline earth-like metal atoms, stable isotopes of alkaline earth metal atoms, or stable isotopes of alkaline earth-like metal atoms. Alkaline earth metal atoms are calcium atoms, strontium atoms, barium atoms, and radium atoms. Like alkaline earth metal atoms, alkaline earth-like metal atoms are atoms having an electron configuration without a magnetic moment caused by an electron spin in the ground state and are, for example, beryllium atoms, magnesium atoms, ytterbium atoms, cadmium atoms, and mercury atoms. Since these atoms each have two electrons on the outermost shell, the sum of spin angular momentums of antiparallel electrons is zero. Thus, these atoms are hardly affected by an environmental magnetic field. Atoms having no nuclear spins that are selected from among alkaline earth metal atoms, alkaline earth-like metal atoms, stable isotopes of alkaline earth metal atoms, or stable isotopes of alkaline earth-like metal atoms are particularly desirable because the atoms are not affected by an environmental magnetic field.

Hyperfine structures are not provided for alkaline earth metal atoms, alkaline earth-like metal atoms, stable isotopes of alkaline earth metal atoms, and stable isotopes of alkaline earth-like metal atoms, so that the output of the atomic interferometer cannot be identified by the internal states of atoms. In the present example, however, the spatial resolution of the output of the atomic interferometer is remarkably improved by using high-order Bragg diffraction, allowing visual recognition of the output of the atomic interferometer. In this case, when velocity components in the orthogonal direction in an atomic beam are large, the Bragg diffraction conditions of various orders are satisfied at the same time, thereby reducing the visibility of atomic interference. Hence, the apparatus 700 for collimating an atomic beam is useful for the Mach-Zehnder atomic interferometer 500 in which n-th order Bragg diffraction is used.

The atomic interferometer of the above-described example uses Mach-Zehnder atomic interference that implements n-th order (n 2) Bragg diffraction, but, not limited thereto, may use, for example, Mach-Zehnder atomic interference that implements a two-photon Raman process caused by moving standing light waves (see Reference literature 2).

(Reference literature 2): T. L. Gustayson, P. Bouyer and M. A. Kasevich, "Precision Rotation Measurements with an Atom Interferometer Gyroscope," Phys. Rev. Lett. 78, 2046-2049, Published 17 Mar. 1997.

The atomic interferometer of the above-described example uses Mach-Zehnder atomic interference that performs one-time split, one-time reversal, and one-time combination using three moving standing light waves, but the present invention is not limited to such an example. For example, multiple-stage Mach-Zehnder atomic interference for performing two or more splits, two or more reversals, and two or more combinations may be used. See Reference literature 3 illustrating the multiple-stage Mach-Zehnder atomic interference.

(Reference literature 3): Takatoshi Aoki et al., "High-finesse atomic multiple-beam interferometer comprised of copropagating stimulated Raman-pulse fields," Phys. Rev. A63, 063611 (2001)—Published 16 May 2001.

Moreover, the atomic interferometer to which the apparatus for collimating an atomic beam of the present invention is applied is not limited to a Mach-Zehnder atomic interferometer, but may be, for example, a Ramsey-Borde interferometer.

The present invention is not limited to the foregoing embodiment and can be adaptively changed without departing from the scope of the present invention. For example, the atomic beam source 100 is not limited to the thermal atomic beam source and may be a cooling atomic beam source. Since the third laser beam 701*c* is used for stimulated emission, the third laser beam 701*c* is required to travel in the same direction as the first laser beam 701*a* and in parallel with the first laser beam 701_a_. Furthermore, the traveling directions of the first laser beam 701_a_ and the third laser beam 701_c_ are preferably orthogonal to the traveling direction of an atomic beam. The second laser beam 701_b_ is used for changing the moving direction of atoms that have not been changed to the first excited state in the first step. Thus, the traveling direction of the second laser beam 701_b_ is not required to be orthogonal to the traveling direction of an atomic beam or parallel to the traveling directions of the first laser beam 701_a_ and the third laser beam 701_c_.

In the claims and the description, ordinal numerals are not intended to limit elements modified by ordinal numerals or combined with ordinal numerals, according to the order of the elements or the amounts of the elements unless otherwise specified. The use of ordinal numerals is simply used as a useful expression method for discriminating between at least two elements unless otherwise specified. Hence, for example, "first X" and "second X" are expressions for discriminating between the two Xs. The total number of X is not limited to two or the first X is not always required to precede the second X. "First" does not always mean "initial."

In the claims and the description, "include" and inflections thereof are used as nonexclusive expressions. For example, a sentence "X includes A and B" does not exclude X including constituent elements (for example, C) other than A and B. If a sentence includes an expression "include" or a phrase in which an inflection of "include" is combined with a negative expression (for example, "not include"), the sentence only refers to the object. Thus, for example, a sentence "X does not include A and B" suggests that X may include constituent elements other than A and B. Furthermore, a term "or" is not intended to be exclusive OR.

Although the embodiments of the present invention have been described above, the present invention is not limited to these embodiments. The present invention can be changed and modified in various ways without departing from the scope of the present invention. The selected and described embodiment is intended to explain the principle and the practical application of the present invention. The present invention is changed or modified in various ways and is used as various embodiments. The changes or modifications are determined according to an expected purpose. The changes and modifications are all intended to be included in the scope of present invention specified by the accompanying claims. In interpretation according to an impartial, legal, and fair extent, the changes and modifications are intended to be similarly protected.

LIST OF REFERENCE NUMERALS

100 Atomic beam source
100_a_ Body part
100_b_ Nozzle
110 Thermal atomic beam
200 Vacuum chamber
700 Apparatus for collimating an atomic beam
701_a_ First laser beam
701_b_ Second laser beam
701_c_ Third laser beam
710 Irradiator
721 Laser light source
722 Laser light source
730 Beam splitter
740 Lens

What is claimed is:

1. An apparatus for collimating an atomic beam that contains atoms of a single kind, each having at least three distinct energy levels respectively corresponding to a ground state, a first excited state, and a second excited state, the apparatus comprising:

an irradiator configured to irradiate the atomic beam with a first laser beam, a second laser beam, and a third laser beam in this order, the first laser beam having a wavelength corresponding to a transition between the ground state and the first excited state, the second laser beam having a wavelength corresponding to a transition between the ground state and the second excited state, and the third laser beam having a wavelength corresponding to a transition between the ground state and the first excited state.

2. The apparatus according to claim 1, wherein $\Delta v=\Gamma/k_1$, where $\Delta v$ is a predetermined maximum value of velocity components, in a direction orthogonal to a traveling direction of the atomic beam, of atoms in the atomic beam, the atoms being changed from the ground state to the first excited state when the atomic beam passes through the first laser beam, $\Gamma$ is a full width at half maximum of an absorption spectral line of atoms in the atomic beam, the atoms being changed from the ground state to the first excited state when the atomic beam passes through the first laser beam, and $k_1$ is a wave number of the first laser beam.

3. The apparatus according to claim 2, wherein $\tau_1 \geq (D+W_1/2+W_3/2)/V$, where $\tau_1$ is a life of the first excited state, D is an inter-axial distance between a central axis of the first laser beam and a central axis of the third laser beam, $W_1$ is a beam width of the first laser beam, $W_3$ is a beam width of the third laser beam, and V is a mean velocity of atoms in the traveling direction of the atomic beam.

4. The apparatus according to claim 3, wherein a traveling direction of the third laser beam is parallel to the traveling direction of the first laser beam.

5. The apparatus according to claim 3, wherein $W_2/V \geq \tau_2 \times v_0/v_{recoil,\lambda 2}$, where $\tau_2$ is a life of the second excited state, $v_0$ is an estimated maximum value of velocity components of atoms in a direction orthogonal to the traveling direction of the atomic beam, $v_{recoil,\lambda 2}$ is a recoil velocity, in the direction orthogonal to the traveling direction of the atomic beam, received by an atom in the atomic beam from a photon in the second laser beam, and $W_2$ is a beam width of the second laser beam.

6. The apparatus according to claim 5, wherein a traveling direction of the third laser beam is parallel to the traveling direction of the first laser beam.

7. The apparatus according to claim 2, wherein a traveling direction of the third laser beam is parallel to the traveling direction of the first laser beam.

8. The apparatus according to claim 1, wherein $\tau_1 \geq (D+W_1/2+W_3/2)/V$, where $\tau_1$ is a life of the first excited state, D is an inter-axial distance between a central axis of the first laser beam and a central axis of the third laser beam, $W_1$ is a beam width of the first laser beam, $W_3$ is a beam width of the third laser beam, and V is a mean velocity of atoms in the traveling direction of the atomic beam.

9. The apparatus according to claim 8, wherein $W_2/V \geq \tau_2 \times v_0/v_{recoil,\lambda 2}$, where $\xi_2$ is a life of the second excited state, $v_0$ is an estimated maximum value of velocity components of atoms in a direction orthogonal to the traveling direction of the atomic beam, $v_{recoil,\lambda 2}$ is a recoil velocity, in the direction orthogonal to the traveling direction of the atomic beam, received by an atom in the atomic beam from a photon in the second laser beam, and $W_2$ is a beam width of the second laser beam.

10. The apparatus according to claim 9, wherein a traveling direction of the third laser beam is parallel to the traveling direction of the first laser beam.

11. The apparatus according to claim 8, wherein a traveling direction of the third laser beam is parallel to the traveling direction of the first laser beam.

12. The apparatus according to claim 1, wherein a traveling direction of the third laser beam is parallel to the traveling direction of the first laser beam.

13. An atomic interferometer comprising:

an atomic beam generator configured to continuously generate an atomic beam that contains atoms of a single kind, each having at least three distinct energy levels respectively corresponding to a ground state, a first excited state, and a second excited state;

a moving standing light wave generator configured to generate three or more moving standing light waves; and an interference device configured to obtain the atomic beam as a result of an interaction between the atomic beam and the three or more moving standing light waves, wherein the atomic beam generator includes:

an atomic beam source; and an atomic-beam collimator, the atomic-beam collimator includes:

an irradiator configured to irradiate the atomic beam with a first laser beam, a second laser beam, and a third laser beam in this order, the first laser beam having a wavelength corresponding to a transition between the ground state and the first excited state, the second laser beam having a wavelength corresponding to a transition between the ground state and the second excited state, and the third laser beam having a wavelength corresponding to a transition between the ground state and the first excited state.

14. An atomic gyroscope comprising:

an atomic beam generator configured to continuously generate an atomic beam that contains atoms of a single kind, each having at least three distinct energy levels respectively corresponding to a ground state, a first excited state, and a second excited state;

a moving standing light wave generator configured to generate three or more moving standing light waves;

an interference device configured to obtain the atomic beam as a result of an interaction between the atomic beam and the three or more moving standing light waves; and a monitor configured to detect an angular velocity or an acceleration by monitoring the atomic beam from the interference device, wherein the atomic beam generator includes:

an atomic beam source; and an atomic-beam collimator, the atomic-beam collimator includes:

an irradiator configured to irradiate the atomic beam with a first laser beam, a second laser beam, and a third laser beam in this order, the first laser beam having a wavelength corresponding to a transition between the ground state and the first excited state, the second laser beam having a wavelength corresponding to a transition between the ground state and the second excited state, and the third laser beam having a wavelength corresponding to a transition between the ground state and the first excited state.

* * * * *